Jan. 29, 1924.

G. A. JESSOP

HYDRAULIC TURBINE

Filed Nov. 29, 1922

Inventor
George A. Jessop

By 
Attorney

Jan. 29, 1924.

G. A. JESSOP

1,482,236

HYDRAULIC TURBINE

Filed Nov. 29, 1922    4 Sheets-Sheet 3

Inventor
George A. Jessop

Patented Jan. 29, 1924.

1,482,236

UNITED STATES PATENT OFFICE.

GEORGE A. JESSOP, OF YORK, PENNSYLVANIA, ASSIGNOR TO S. MORGAN SMITH COMPANY, OF YORK, PENNSYLVANIA, A CORPORATION OF PENNSYLVANIA.

HYDRAULIC TURBINE.

Application filed November 29, 1922. Serial No. 604,068.

*To all whom it may concern:*

Be it known that I, GEORGE A. JESSOP, a citizen of the United States, residing at York, county of York, and State of Pennsylvania, have invented certain new and useful Improvements in Hydraulic Turbines, of which the following is a specification.

This invention relates to hydraulic turbines and particularly to a head increaser control means.

The various features of the present invention are to be applied to the type of head increaser or ejector turbine structure disclosed by the Swedish patent granted to K. G. Sjoberg March 16, 1898, No. 10,191, and wherein the usual form of runner or wheel is mounted on and operates a turbine shaft and discharges into a draft tube having below the runner or wheel an annular inlet which extends inwardly at a downward angle of inclination and is controlled by an upwardly opening annular valve disposed close to the inner termination of the inlet. The annular inlet or channel of this Swedish patent permits the inflow of auxiliary water into the draft tube and constitutes a regulable head increaser or ejector for the turbine, with material advantages in the operation of the latter under certain excess water supply conditions, which is well understood in the art.

Structural objections and operative disadvantages attend the disposition or location of the annular valve at or adjacent to the inner termination of the annular channel or auxiliary water inlet in the head increaser or ejector type of turbines. Among these objections and disadvantages may be mentioned the inconvenience experienced relatively to the disorganization of the turbine structure above the annular inlet incident to placement of the annular valve at or adjacent to the inner termination of the inlet for auxiliary water and the means for operating such annular valve; the inability to readily reach and repair or readjust the valve located at or near the inner termination of the inlet for the auxiliary water, and the liability of accumulation of silt or sediment carried by the water in the annular inlet for the auxiliary water when the latter is fully open from its outer termination inwardly to the inner valve during the period that the said valve is closed and the auxiliary supply through the inlet thereby shut off.

The present improvements have been devised to overcome the numerous disadvantages and objections above noted, by locating the valve to closely cooperate with the outer termination of the inlet and permit effective application thereof without in the least modifying or interfering with the usual structure of the turbine casing and components thereof above the inlet for the auxiliary water and the easy repair and ready accessibility to all of the parts of the valve in the event of deterioration or breakdown. The possibility of quick repair of the exteriorly located valve is particularly true in regard to minor repairs or corrections of small defacements or cuttings on the joints, which should be maintained in water-tight condition when the valve is closed, the faces that may require repair being exposed by the exterior location of the valve for cleaning or scraping in contradistinction to the inaccessible closing joints of the type of valve above referred to and located at or adjacent to the inner termination of the auxiliary water inlet. Another and very important advantage of the improved construction, or the exterior location of the valve at the outer termination of the auxiliary water inlet, is that in flumes located along streams which carry mud or sand either continually or during flood periods, there is apt to be a considerable deposit in the bottom of the flume, in the corners and underneath the bottom gate plate, where there is ordinarily little or no velocity. Naturally, where there are spaces of quiet or nearly quiet water, the sand or silt is deposited and these comparatively quiet spaces therefore gradually become filled with mud and sand. Since the inlet for the auxiliary water is located underneath the gates adjacent to comparatively quiet water, except when the head increaser is in use, the head increaser inlet if closed with an interiorly located valve will become filled with the deposit above described. Under the latter conditions the mud and sand might be deposited in sufficient quantities to entirely cover the outer termination of the auxiliary inlet, and if the inlet is entirely covered so that the water is shut out, as with a dam, it may be impossible to start a flow through the increaser without emptying the flume and cleaning away the deposit. This entire damming of the increaser inlet will be more liable to occur where an interiorly located valve is used than with an exteriorly applied valve, in view of the fact that the interior valve forms with the inlet a pocket in which the mud and sand is free to accumulate. A still further advantage in locating the valve at the outer termination of the head increaser inlet is that the interior valve must be located lower with respect to the runner than the exterior valve.

In addition to the features incident to the location of the valve exteriorly of or at the outer termination of the increaser inlet or the inlet for the auxiliary water, the present improvement also contemplates certain detail construction and arrangement of parts which will be more fully hereinafter described and claimed.

The head increaser or ejector with which the improved features of invention are applied in the present instance augments the suction directly in the ordinary form of draft tube or water discharge means to such a degree as to materially increase a given water head on a turbine and correspondingly increases the speed and power of a turbine, and also regulates the suction or water pull in the draft tube or discharge means relatively to the water head in such manner as to render the turbine power generating means easily controllable to compensate for, or obviate the disadvantages incident to, diminution of speed or power due to fall or loss of head during high water, or from any other cause. The increased suction in the draft tube or discharge means is effected by admitting water thereinto from the exterior of the tube or discharge means in regulable quantities at the most advantageous point without detracting from the structural contour and efficiency of the usual form of draft tube or water discharge or outlet means, or in any manner modifying the installation of turbine organizations as made and used at the present time, as hereinbefore specified and which will now be particularly described.

The numeral 5 designates the shaft, 6 the runner and 7 the gates of a turbine, all constructed and arranged as well known and forming no part of the present invention. The turbine also has the usual enclosing members or cast or other suitably formed casings and includes a draft tube ring 8 with a lower flange 9 suitably secured to the flange 10 of the usual form of draft tube 11, which may be of any well known type, that shown in the accompanying drawings being of concrete construction. It is intended, however, to use either a concrete or metal draft tube, as may be preferred and a particular installation of the improvements may require.

The auxiliary water inlet for the draft tube or delivery means as illustrated in the drawings is located in the draft tube ring 8 and is in the form of an annular space 12 normally open at the outer and inner terminals and has upper and lower walls 13 and 14 which are inwardly inclined. The inlet or space 12 inclines downwardly and inwardly from the outer to the inner side of the ring 8 and is divided at intervals by means which will be more fully hereinafter explained. This inlet or space 12 for admission of auxiliary water to the draft tube may be placed at any point between the runner and outlet of the draft tube as various operating conditions may require, but to obtain the best practical results and efficiency, it should be located adjacent to the runner. This inlet also may be varied in shape and size, but the inner outlet thereof should be so positioned as to cause the water entering therethrough into the draft tube to take the direction of the water discharged from the runner, to avoid interference with said runner-discharged water and also to more effectively act through the latter to increase the suction through the draft tube and the head on the turbine. It is known that with some designs of runner, under certain conditions of discharge, the water revolves in a direction opposite to the direction of movement of the runner. With other designs of runner, under certain conditions of discharge, the water revolves with the runner, or moves in the same direction as the latter. To compensate for these differentiations in the movement of the water from the runner through the discharge tube, it is intended to render the improvements efficient under all conditions of movement of the discharge water by a radial rib structure which constitutes an incidental feature of the invention.

Figure 1:
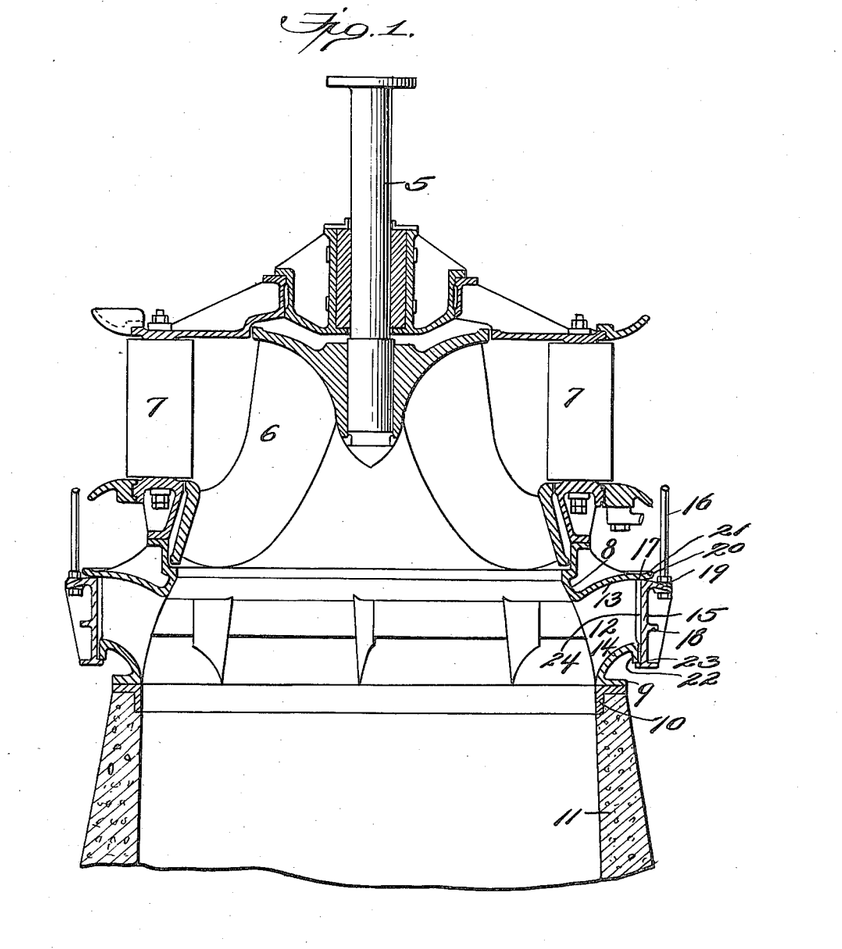
Fig. 1 is a transverse vertical section through a turbine and portion of a draft tube, showing a head increaser or auxiliary water inlet provided with one form of the improved exteriorly located valve, the valve in this instance having a downwardly opening movement.

The present invention contemplates the provision of a novel form and particular disposition of valve means to regulate and control the admission of the water through the auxiliary inlet or space 12, and one form and particular application is illustrated by Fig. 1, wherein a sliding cylinder gate 15 is mounted and operates to closely engage the outer termination of the said auxiliary inlet or space 12 and cooperates with the outer terminals of the walls 13 and 14, the said sliding cylindrical gate 15 having adjusting rods 16 operable at any point above or distant from the turbine by suitable mechanical devices to vertically shift the cylinder gate to uncover more or less of the inlet or space 12 as may be desired, or, to entirely cut off the supply of water through this auxiliary inlet. Specifically, the sliding cylinder gate 15 has an inner straight face 17 and an outer intersecting strengthening rib and web formation, as at 18, and also an upper outwardly projecting and preferably downwardly curved flange 19, to which the adjusting or operating rods 16 are attached. In the form of the gate 15 shown by Fig. 1, the upper inner terminal of the flange 19 where it intersects the main body of the gate closes against the underside of the outer extremity of the top wall 13, said extremity being extended beyond the outer terminal of the lower wall 14, as at 20, and having a slight upward flare 21, to facilitate the inflow of the auxiliary water through the inlet or space 12 when the gate is open, or to permit the inflow of this water without the least obstruction at this point. The lower wall 14 has less length than the upper wall 13 and the outer terminal thereof is in the form of a depending abutment or contact flange 22 against which an inwardly projecting foot flange 23 formed as a part of the gate has engagement when the gate is closed. A space 24 is provided between the inner face 17 of the gate 15 and the outer edges of the ribs, which will be more fully hereinafter described, disposed at intervals in the auxiliary inlet or space 12 and also between said face and the outer side of the flange 22 of the wall 14. The object of this spaced relation between the inner side or face 17 of the gate and the parts of the auxiliary water inlet or head increaser structure as just explained is to avoid any tendency of the gate sticking when closed and insure free operating application of the gate at all times. It is obvious that the inner face or side of the gate if brought into contact with the outer terminal parts of the auxiliary inlet or head increaser when the gate is closed would adhere through corrosion of the said engaging parts and obstruct the easy opening movement of the gate, and in view of the particular engagement of the upper and lower portions of the gate with the walls 13 and 14 as above explained, a water-tight joint is formed without resorting to direct contact of the inner face or side of the gate with adjacent parts of the auxiliary inlet or head increaser structure. In opening the gate as shown by Fig. 1, the movement of the gate is downward and the draft tube construction below will be of such dimensions as to provide ample clearance for a full opening adjustment of the gate. Conversely, the gate is closed by drawing upwardly upon the same through the medium of the rods 16, and it will be understood that the gate may be opened to any degree between a maximum full open position and a completely closed adjustment thereof.

Figures 2, 7:
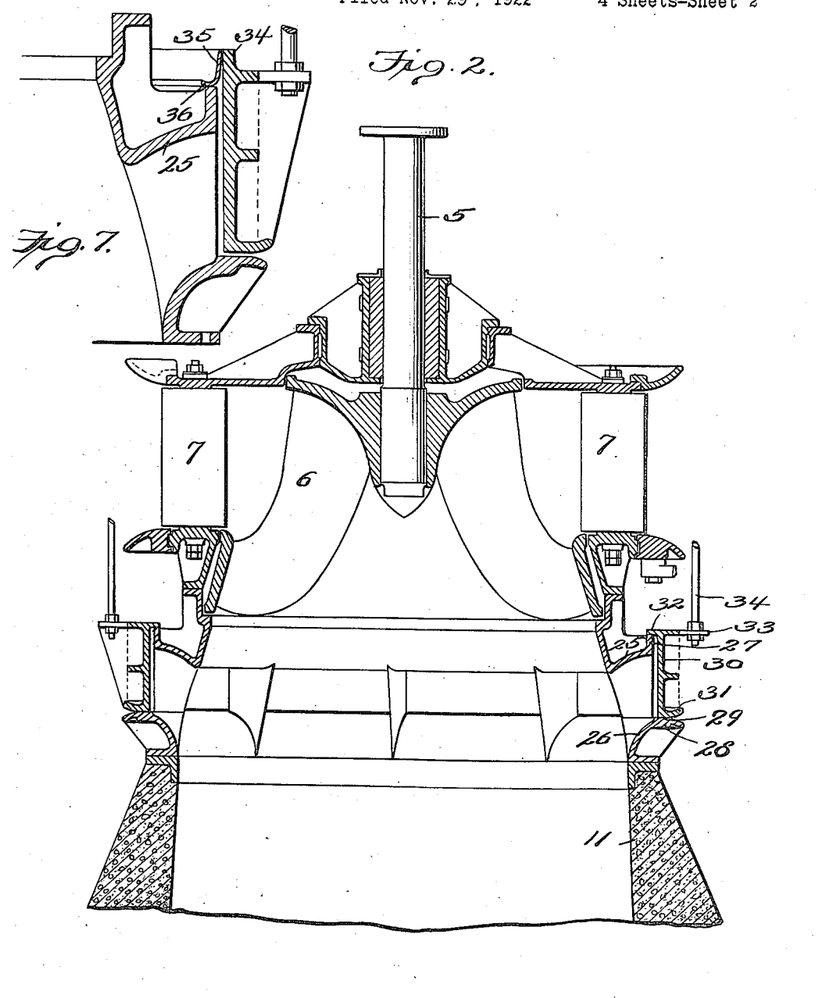
Fig. 2 is a view similar to Fig. 1, showing the exteriorly located valve arranged to open upwardly.
Fig. 7 is a modification of the structure of the gate shown by Fig. 2.

In Fig. 2 the turbine structure together with the draft tube ring 8 interposed between the main turbine structure or runner and the draft tube and the auxiliary inlet or space 12 are all practically the same as shown by Fig. 1, and similar reference characters are applied to the corresponding parts. The auxiliary inlet or space 12 as shown by Fig. 2 is formed by an upper wall 25 and a lower wall 26, the upper wall 25 having less outward projection than the said lower wall and formed with an upwardly projecting abutment or contact flange 27 at an angle to its wall, and the lower wall 26 has an outer flaring extremity 28 with a seat 29 formed at the top thereof, or the structures of the walls 25 and 26 are practically reverse to that shown by Fig. 1, to accommodate the mounting and operation of an upwardly opening valve in the form of a sliding cylinder gate 30, which in all respects is the same as the gate 15 with the exception that the downwardly curved flange 19 shown in Fig. 1 is reversed in Fig. 2 in the form of an upwardly curved lower flange 31 continuing outwardly from the lower end of the cylinder gate 30, and the upper end of the gate 30 has an inwardly projecting angular flange 32 corresponding to the foot flange 23 of the downwardly opening gate 15 illustrated by Fig. 1. The upper end of the gate 30 also has projections 33 extending outwardly therefrom for the attachment of the lower ends of operating rods 34. The flange 32 in the modified form of the improvement as shown by Fig. 2 closes down on the upper edge of the upwardly extending abutment or flange 27, and the lower end of the gate engages the seat 29 when the gate 30 is closed downwardly. The same spaced construction between the inner face or side of the gate 30 and the adjacent outer terminal parts of the wall and rib structures of the auxiliary water inlet or space 12 is provided in the form of the device shown in Fig. 2 as in the first form and for the same purpose. The gate 30 operates reversely to the gate 15 in opening the auxiliary water inlet or passage 12 as shown by Fig. 2 relatively to the opening movement of the gate 15 shown by Fig. 1, but the details of construction or the essential features of each gate and the operating means therefor are the same in both forms of this part of the improvement, there being simply a reversal of corresponding structural features to insure a tight closing operation of each form of gate and also in effecting full or partial opening adjustment of each gate.

In the modified form of the gate shown by Fig. 7 the same general structural features are present as in the form of the gate illustrated by Fig. 2, with the exception that the top flange 32 of the gate 30 is omitted and the gate structure at the top is slightly extended vertically, as at 34, and has the upper edge of a spring steel ring 35 secured to the inner side thereof. The lower extremity 36 of this ring is shaped to closely contact with the upper adjacent edge of the top wall 25, to form a water-tight joint, this joint being rendered exceptionally tight in view of the fact that the said lower extremity 36 of the ring 35 engages the upper outer edge of the wall 25 prior to a full closure bearing of the lower end of the gate on the seat 29. It will be obvious that owing to the yielding characteristics of the ring 35, the said ring will bend or give sufficiently to permit a full closure of the gate without obstruction and at the same time produce a tight joint at the top portion of the gate relatively to the edge of the outer upstanding portion of the top wall 25 and prevent leakage of water through the co-operative jointure of the gate with this part of the ring comprising the auxiliary water inlet or space 12.

Figure 3:
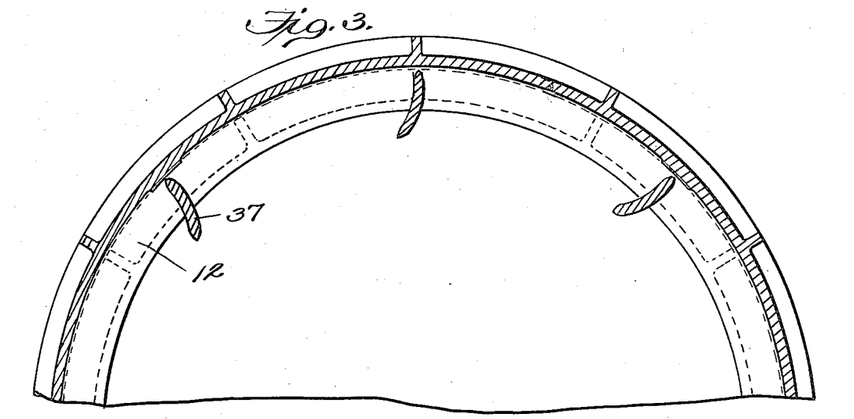
Fig. 3 is a horizontal section through a portion of the turbine taken at about the center of the head increaser or auxiliary water inlet and showing curved deflecting vanes or blades fixed in the inlet at intervals.
Figures 4, 5:
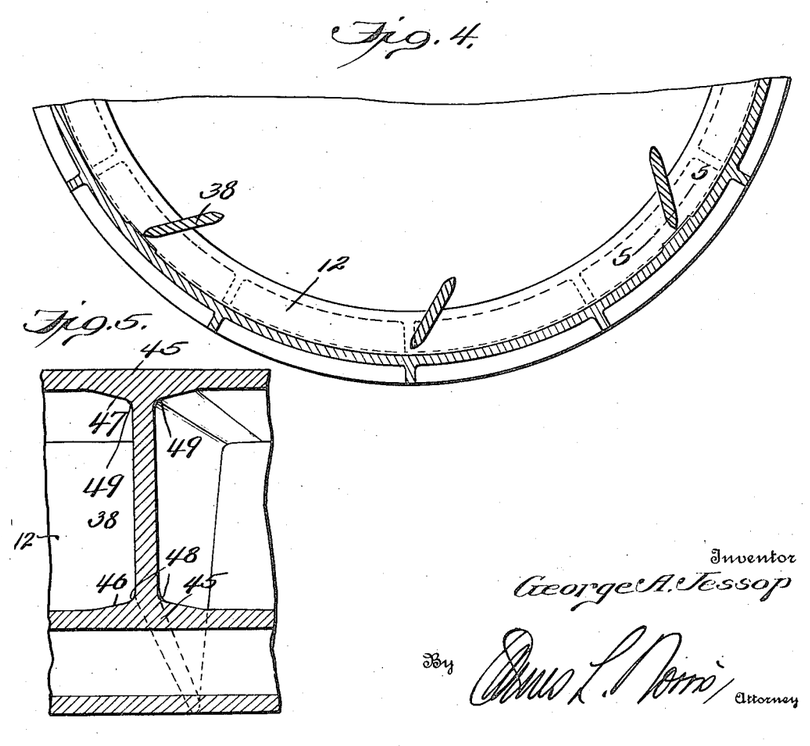
Fig. 4 is a view similar to Fig. 3, showing a modification of the blades or deflecting vanes illustrated by Fig. 3.
Fig. 5 is an enlarged section on the line 5—5, Fig. 4, and also applicable to the structure of the deflecting vanes or blades as shown by Fig. 3 and particularly illustrating a reinforced or strengthened application of the said vanes or blades.

At regular intervals throughout the auxiliary water inlet or space 12 constituting the essential feature of the head increaser or ejector, ribs are introduced and may be either curved ribs 37 are shown by Fig. 3, or straight ribs 38 as shown by Fig. 4. Both forms of the ribs are diagonally disposed, the curved ribs 37 by their contour providing a diagonal position thereof and the straight ribs 38 are positively arranged at angles or diagonally relatively to the radii of the ring having the auxiliary water inlet or passage 12 formed therein. These diagonal ribs have a very large increase in strength to resist rotational tendency of the ring in which the auxiliary water inlet is formed relatively to ribs that are disposed in radial lines or straight or those that project inwardly in straight lines. Both forms of ribs or vanes 37 and 38 serve as water directing means, and the curved ribs 37 in addition to providing for increased strength also have such shape at the entrance of the auxiliary water inlet or space 12 that the water which approaches said auxiliary inlet in a radial direction will impinge upon these vanes without shock and be turned gradually. Actual designs of head increasers or auxiliary inlets for medium and large sized turbines have demonstrated that the height between the lower and upper walls is considerable, and where radially straight ribs or vanes have been used, the bending effect on the latter ribs due to rotational tendency is so large that special provisions are necessary for taking care of the stresses. The improved ribs as shown by Figs. 3 and 4 take care of all stresses or strains in the most effective manner.

Figure 6:
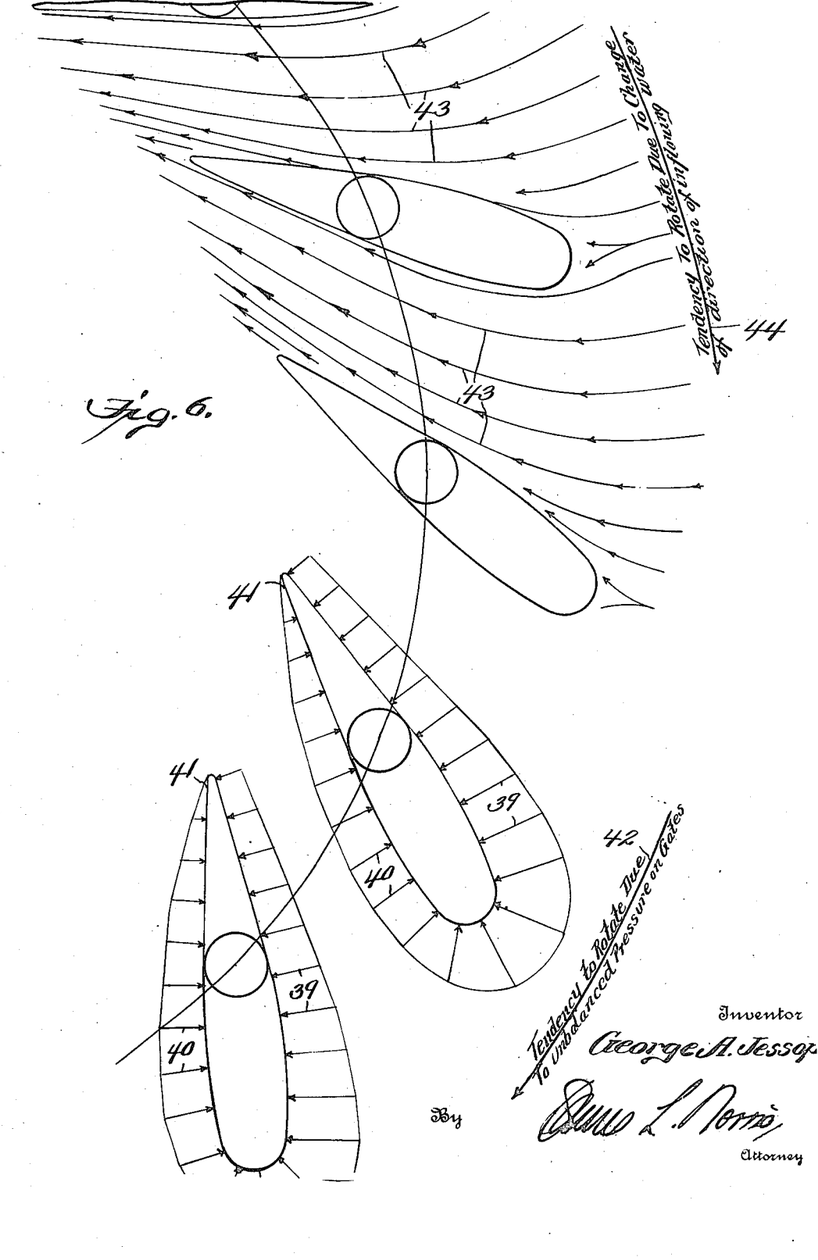
Fig. 6 is a diagrammatic view illustrating the tendency to rotate the gates due to unbalanced pressure thereon and also tendency to rotate the gates due to change of direction of inflowing water relatively to the gates, which requires a strengthening structure to set up a resistance to the disadvantages incident to these conditions.

As an illustration of the resisting strength required in turbine structures to overcome certain rotational tendencies and to resist stresses or strains incident to water entering through the gates 7 of the turbine, attention is called to the diagrammatic representation shown by Fig. 6. The lower part of this figure illustrates the tendency to rotate due to unbalanced pressure on the gates owing to the change in the velocity of the water as it enters between the gates at the outside and leaves said gates at the inside, there being considerably more pressure on one side of each gate than on the other. The diagram at the lower portion of Fig. 6 does not show the actual pressure but the difference in pressure on the gates as indicated by the arrows 39 and 40. It will be observed that at the side edge of each gate there is one point where zero pressure is indicated, as at 41. By zero pressure it is not meant that the pressure at this point is entirely eliminated, but, as shown by the arrows, in actual proportional scale, the pressure is greater on one side of each gate than on the other, as clearly illustrated by a difference in the lengths of the arrows. The pressures on every gate and also the relative pressures on every gate are the same. Due to these unbalanced pressures there is, therefore, a tendency to set up a rotation in the direction of the arrow 42. Referring to the remaining portion of this diagram, it has been proved by experiment that the natural way for water to approach the turbine is in a radial direction towards the center of the wheel. As will be seen from the upper portion of the diagram shown by Fig. 6, the gates do not point radially towards the center of the wheel but are at an angle, the gates in this part of the diagram being shown in their extreme wide open position. When the gates are wide open they are more nearly radial than at any other position, as indicated by the arrows 43. As the water flows towards the center of the wheel, it strikes the gates and must be deflected or turned by the gates in a direction as indicated by the said arrows. In turning the water from the radial direction to the direction given by the gates a strain is imposed on each gate, this strain tending to rotate the wheel case in the direction of the arrow 44, and it will be noted that this direction of rotation is the same as the direction due to difference in pressures on the gates. In the case of large wheels, or even small and medium sized wheels under medium heads, this tendency to rotate due to accumulation of unbalanced pressures on each gate amounts to considerable and a serious total. It is therefore obvious that the structure must be provided with sufficient strength to overcome this tendency to rotate and also to so construct each rib or vane in the auxiliary water inlet for connecting the upper and lower walls of the latter that deterioration will be resisted and the necessary binding strength and solidarity of the structure as a whole effectively preserved. The entire support for the turbine is provided by the auxiliary inlet ring or casting comprising the upper and lower walls connected at intervals by ribs, it being preferred that the said upper and lower walls and ribs be cast solid though they could be otherwise connected. These ribs therefore must be of sufficient strength to overcome the unbalanced pressures or rotational tendency of the turbine hereinbefore considered. To insure individual strength of each rib and particularly in its structural association with the upper and lower walls of the auxiliary water inlet or space 12, at the point of juncture, for instance, of each rib 38 with the upper and lower walls, an increase in the thickness of the metal is provided as at 45, said increase being similar on each side of each rib at its point of intersection with the said upper and lower walls, as clearly shown by Fig. 5. The inner opposing face portions of the increase in thickness of the walls at the points of juncture therewith of the ribs are reversely inclined, as at 46 and 47, the lower faces of the thickened portions of the bottom wall trending upwardly and gradually merging into the vertical rib walls 47 with curved contours as at 48, and, likewise, the inner faces 47 of the upper thickened portions 45 are downwardly inclined towards each vertical rib wall and gradually merge into the latter by curved contours, as at 49. It will be seen that the surfaces of the reversely inclined opposing face portions of the increased thickness of material of the walls at the points of juncture therewith are straight, for the purpose of providing as much material or metal at these points as possible in contradistinction to less material at these points which would result from the formation of curved or concave surfaces at these points. Furthermore, it will be seen that the auxiliary inlet ring or casting comprising the inlet organization is fixed and the ribs 37 and 38 have portions thereof projecting inwardly into the open space within the ring beyond the inner terminal of the remaining portion of said ring, so as to effectively direct the water inflowing through the auxiliary passage into the interior of the ring in accordance with the angle of the said ribs. This particular curved configuration will minimize the tendency of settlement of any deposit at the points of intersection of the vertical rib walls with the upper and lower walls of the auxiliary water inlet or space 12, and as a consequence, weakening of the rib walls at their points of juncture with the upper and lower walls by corrosion is, likewise, reduced to a minimum. This increased wall width structure at the juncture of each rib or vane with the upper and lower walls of the auxiliary water inlet or space 12 constitutes a fillet, and in practice the latter will be formed with a comparatively long taper and a very small radius where this long taper joins the rib, and it is also proposed to make the same as large or as small as may be desired to obtain the best results, and which is to set up a strong resistance to the rotating tendency of the unbalanced forces acting on the turbine gates and which will be regulated in accordance with the general dimensions of the turbine structure.

From the foregoing it will be seen that all of the features of the improvement have been devised and developed for the purpose of rendering the head increaser or ejector more efficient both structurally and operatively, and as an additional emphasis in regard to the particular application and operative association of the exterior valve or cylinder gate, it will be observed that one of the walls of the auxiliary inlet or space 12 at the outer extremity of said wall is formed with a flared flange, so as to facilitate the entrance of water into the said auxiliary inlet or space with less resistance. Moreover, by disposing the upper and lower walls of the auxiliary inlet or space so that they have an inward and downward incline, the discharge capacity of the said inlet will be materially increased. The rods or devices for operating the exteriorly located valves or cylinder gates have connections, due to the exterior location of the valve or gate, that can be made more conveniently and cheaply as well as stronger, and furthermore, the adjusting force on the valve or gate will be more direct. Structurally the improved exteriorly located valve and the parts of the walls of the auxiliary inlet with which it operates have been devised, as hereinbefore described, to avoid any possible leakage, and the top and bottom engaging surfaces of the valve members as well as the walls will in practice be machine finished, to establish close contacts at precisely the same time relatively to the upper portion of the valves and the parts of the walls with which they engage. By the use of the spring steel ring shown by Fig. 7, all possibility at a point which might otherwise be weak is prevented, and it will be understood that this spring steel ring is equally applicable to both the downwardly and upwardly closing valves.

The improved features are not limited in their practical operation by association with any particular form of draft tube, and as heretofore indicated, it is proposed to use either a sheet metal draft tube of proper length or a concrete draft tube, and also a draft tube that may extend straight down with a regular flare towards its outlet end, or a laterally curved draft tube gradually increasing in area towards its outlet extremity. It is also proposed to use the improved features if desired with the form of draft tube disclosed by the Swedish patent hereinbefore noted, all of these forms of draft tubes being well known and having been long in use and installed as found necessary to meet contingencies attending various turbine installations. Moreover, it will be further understood that in the form of the gate which is mounted to rise or move upwardly to open the same, it will be necessary to have the auxiliary inlet further from the runner in order to obtain sufficient clearance for the cylinder gate between the turbine bottom plate and the inlet casing so that the gate may be fully raised. The upwardly moving cylinder gate, however, has an advantage in that the diameter of the gate may be smaller, as it does not have to clear the draft tube structure adjacent to the auxiliary inlet ring or casing or the draft tube curb ring, which is shown in the accompanying drawings in the usual form imbedded in the concrete. If the gate mounted for upward movement to open the same is made the same size as the gate mounted for downward movement to open the auxiliary inlet or passage 12, the lower structure associated with and forming a part of the draft tube may be made larger in diameter for the lifting gate than for the lowering gate, and, therefore, in particular installations where it is found necessary, additional strength can thus be obtained. The exteriorly located valve or cylinder gate is also advantageous as compared to a gate located at or adjacent to the inner termination of the auxiliary inlet, for the reason that no changes in the structure of the ordinary turbine installation is necessary to operatively apply the exterior valve or gate, and hence the cost of installation is correspondingly reduced.

What is claimed as new is:

1. A hydraulic turbine having a runner, controllable means for admitting water to the runner, a draft tube into which the runner discharges, an inlet organization having upper and lower walls associated with the draft tube below the runner and turbine structure for admitting auxiliary water into and increasing the suction on the draft tube and the head on the runner, the inner termination of the inlet sloping outwardly and downwardly to the upper extremity of the draft tube without projecting into the latter, and vertically movable means applied to the outer open portion of said inlet organization and adapted to engage and be limited in movement by contact with the outer terminals of the inlet walls and operable to control the entrance of water into the inlet organization and the draft tube, the one inlet organization wall having an outer flaring terminal and the inner termination of the inlet organization being always open to the draft tube.

2. A turbine having a runner, controllable means for admitting water to the runner, a draft tube into which the runner discharges, downwardly inclined auxiliary inlet means associated with and surrounding the draft tube and having its inner termination always open to the said tube, the inlet means admitting supplemental water into the draft tube to increase the suction in the latter and the head on the runner, the inlet means having upper and lower walls and one of the walls projected outwardly a greater distance than the other and flared, the inner termination of the inlet sloping outwardly and downwardly to the upper extremity of the draft tube without projecting into the latter, and vertically movable means applied to the outer termination of the inlet means to control the admission of the supplemental water into the draft tube and having contact with the walls of the inlet means when closed and also provided with operating devices located wholly exteriorly of the turbine organization.

3. A turbine having a runner, controllable means for admitting a motive fluid to the runner, a draft tube into which the runner discharges, an inlet organization associated with and surrounding the draft tube below the runner and having a downwardly inclined passage therethrough for admitting auxiliary fluid into and augment the suction in the tube and increase the head on the runner, the downwardly inclined passage through the inlet organization being between upper and lower walls one of which projects outwardly a greater distance than the other and is flared and the remaining wall formed with an angular projection, the inner termination of the downwardly inclined passage of the inlet organization being always in open communication with the draft tube, and vertically movable annular means applied to the outer termination of the inlet organization to control entrance of auxiliary fluid into the latter, the upper and lower portions of the said vertically movable annular means engaging with the flaring portion of the one inlet organization wall and the projection of the remaining wall when the annular means is closed.

4. A turbine having a runner, means having an opening and closing movement for controlling admission of water to the runner, a draft tube below the runner into which the latter discharges, an inlet organization interposed between the runner and the draft tube for admitting auxiliary water into the tube to increase the suction in the latter and the head on the runner, the inner portion of the inlet organization being always open for communication with the draft tube, and valve means surrounding and vertically adjustable with relation to the outer termination of the inlet organization, the inlet organization having upper and lower walls with outer projecting portions with which the upper and lower parts of the valve means have contact to form water-tight jointures when the said valve means is closed, the said valve means being operable independently of the means for controlling admission of water to the runner.

5. A turbine having a runner, opening and closing means for controlling admission of water to the runner, a draft tube into which the runner discharges, an inlet organization interposed between the draft tube and the runner for admitting auxiliary water into and increasing the suction in the draft tube and the head on the runner, the inlet organization having upper and lower walls differing in length and the longer wall having an outwardly flaring termination and the shorter wall provided with an angular projection, and a vertically movable cylindrical valve surrounding and cooperating with the outer terminal portion of the inlet organization and operable independently of the opening and closing means for admitting water to the runner, the said cylindrical valve being adjustable to control admission of auxiliary water into the draft tube below the runner and provided at one edge portion with a curved flange and at the other edge portion with an angular projection to cooperate and form water-tight jointures with the outer terminals of the walls of the inlet organization when the valve is closed.

6. A turbine having a runner, opening and closing means for controlling admission of water to the runner, a draft tube into which the runner discharges, an inlet organization interposed between the draft tube and the runner for admitting auxiliary water into and increasing the suction in the draft tube and the head on the runner, the inlet organization having upper and lower walls with a passage therebetween which flares inwardly and downwardly with relation to the draft tube and having its inner termination continually open for communication with said tube, and a vertically movable cylindrical valve surrounding and cooperating with the exterior portion of the inlet organization and operable independently of the opening and closing means for controlling admission of water to the runner, the cylindrical valve also having a terminal flange at one edge and projecting means at the opposite edge to respectively engage and tightly fit against the inner side and outer portions of the respective terminal portions of the walls of the inlet organization to form water-tight joints when the valve is closed.

7. A turbine having a runner, opening and closing means for controlling the admission of water to the runner, a draft tube into which the runner discharges, an inlet organization interposed between the draft tube and the runner for admitting auxiliary water to and increasing the suction in the draft tube and head on the runner, the inlet organization having upper and lower walls differing in length and downwardly and inwardly inclined in flaring relation relatively to the inner open portion of the turbine and providing a downwardly inclined flaring passage, the one wall having an outwardly flaring extremity and the other wall provided with a projection at right angles to the terminal thereof, and a vertically movable valve surrounding the inlet organization and having an outwardly projecting flange at one edge to engage the flaring terminal of one wall and flange means at the opposite end to engage the annular projection of the remaining wall to form water-tight joints with the outer extremities of the walls when the valve is closed.

8. A turbine having a runner, opening and closing means for controlling admission of water to the runner, a draft tube into which the runner discharges, an inlet organization interposed between the draft tube and the runner for admitting auxiliary water into the draft tube below the runner and increasing the suction in said tube and the head on the runner, said inlet organization having upper and lower inwardly and downwardly inclined walls with a passage therethrough continually open at its inner termination, the one wall being projected outwardly a greater distance than the remaining wall and flared and formed with a valve seat and the shorter wall having outer terminal angular means, a vertically movable cylindrical valve surrounding and cooperating with the exterior portion of the inlet organization and the passage through the latter and operable independently of the opening and closing means controlling the admission of water to the runner, the said cylindrical valve having at the respective ends thereof a curved flange to engage the valve seat terminal of one wall and a flange to engage the angular means of the other wall, and devices for operating the valve attached to the outer upper end portion of the latter.

9. A turbine having a runner, controllable means for admitting motive fluid to the runner, a draft tube below and into which the runner discharges, an inlet organization interposed between the draft tube and the runner for admitting auxiliary fluid into and increasing the suction in the draft tube and the head on the runner and having the inner terminal thereof without material projection into the interior of the turbine structure and the draft tube, the inlet organization having a passage therethrough defined between upper and lower walls and the outer portion of the one wall extending outwardly beyond the other and flared to reduce the resistance to free entrance of water into the said passage, and vertically movable valve means operable independently of the controlling means for admitting motive fluid to the runner and applied to and cooperating with the exterior of the inlet organization.

10. A turbine having a runner, controllable means for admitting a motive fluid to the runner, a draft tube into which the runner discharges, an inlet organization interposed between the draft tube and the runner for admitting auxiliary fluid into and increasing the suction in the draft tube and the head on the runner, the inlet organization having a passage therethrough defined between upper and lower walls and the outer portion of the one wall extending outwardly beyond the other and flared to reduce the resistance to free entrance of the water into the passage, and vertically movable valve means operable independently of the controllable means for admitting fluid to the runner and applied to and cooperating with the exterior of the inlet organization, the adjacent parts of the outer side of the inlet organization and valve also having cooperating structural features to form non-leakable jointures when the valve is closed.

11. A turbine having a runner, controllable means for admitting a motive fluid to the runner, a draft tube into which the runner discharges, an inlet organization interposed between the draft tube and the runner for admitting auxiliary fluid into and increasing the suction in the draft tube and the head on the runner, the inlet organization having a passage therethrough defined by upper and lower walls which diverge inwardly and downwardly, the outer extremity of one wall projecting outwardly beyond the similar extremity of the remaining wall and also having a flared formation and provided with a seat, the opposite wall of less outward extent being formed with an angular member, and a vertically movable valve applied to and cooperating with the outer side of the inlet organization and the outer termination of the passage through the latter, the said valve having at one end a flaring flange to engage the seat of the flaring flange of one wall and the opposite end of the valve provided with a projection to extend over and bear upon the angular member of the remaining wall.

12. A turbine having a runner, controllable means for admitting a motive fluid to the runner, a draft tube into which the runner discharges, an inlet organization interposed between the draft tube and the runner for admitting auxiliary fluid into and increasing the suction in the draft tube and the head on the runner, the inlet organization comprising upper and lower walls with a passage therebetween, and a vertically movable valve surrounding and applied to and cooperating with the outer side of the inlet organization and the outer termination of the passage, the upper and lower portions of the valve engaging adjacent parts of the upper and lower walls of the inlet organization and the inner side of the valve between the upper and lower ends thereof being spaced from and clear of the adjacent parts of the outer side of the inlet organization when the valve is closed.

13. A turbine having a runner, controllable means for admitting a motive fluid to the runner, a draft tube into which the runner discharges, an inlet organization interposed between the draft tube and the runner for admitting auxiliary fluid into and increasing the suction in the draft tube and the head on the runner, and a vertically movable cylindrical valve applied to and cooperating with the outer side of the inlet organization and having a yielding spring ring connected to one end thereof to bear upon and form a tight joint with a part of the inlet organization when the valve is closed.

14. A turbine having a runner, controllable means for admitting a motive fluid to the runner, a draft tube into which the runner discharges, an inlet organization interposed between the draft tube and the runner for admitting auxiliary fluid into and increasing the suction in the draft tube and the head on the runner, the inlet organization being fixed against movement and having a passage therethrough defined by upper and lower walls connected at intervals by vertically disposed ribs arranged in oblique directions to true radial lines, and having portions thereof projecting into the interior open space of the inlet organization and beyond the remaining inner terminal portion of said organization, the walls at the points of intersection therewith of the ribs being thickened to reinforce the inlet organization and to resist rotating tendencies of the turbine structure above.

15. A turbine having a runner, controllable means for admitting a motive fluid to the runner, a draft tube into which the runner discharges, an inlet organization interposed between the draft tube and the runner for admitting auxiliary fluid into and increasing the suction in the draft tube and the head on the runner, the inlet organization being fixed against movement and having a passage therethrough defined by upper and lower walls connected at intervals by vertically disposed ribs arranged in oblique directions to true radial lines and having portions thereof projecting into the interior open space of the inlet organization beyond the inner terminal of the latter, the walls at the points of intersection therewith of the ribs being thickened to reinforce the inlet organization and resist rotating tendencies of the turbine structure above, the inner opposing sides of the thickened portions of the walls of the jointures therewith of the upper and lower portions of the ribs having reversely inclined straight surfaces merging by curved contour into the opposite sides of the ribs and walls to increase the quantity of metal at the said junctures and provide greater strength and strain resistance of the ribs with relation to the walls and minimize liability of deterioration of the ribs at their points of juncture with the walls.

16. A turbine having a runner, means for controlling admission of water to the runner, a draft tube into which the runner discharges, an auxiliary water inlet organization interposed between the draft tube and the runner for admitting water into and increasing the suction in the draft tube and the head on the runner and having upper and lower walls, and a vertically movable cylindrical valve surrounding and cooperating with the outer terminals of the walls of the auxiliary inlet organization and operable independently of the means for controlling admission of water to the runner, the cylindrical valve and the outer terminals of the walls of the inlet organization having means which engage when the valve is closed to prevent leakage of water through the auxiliary inlet into the draft tube.

In testimony whereof I have hereunto set my hand.

GEORGE A. JESSOP.